United States Patent Office 3,631,206
Patented Dec. 28, 1971

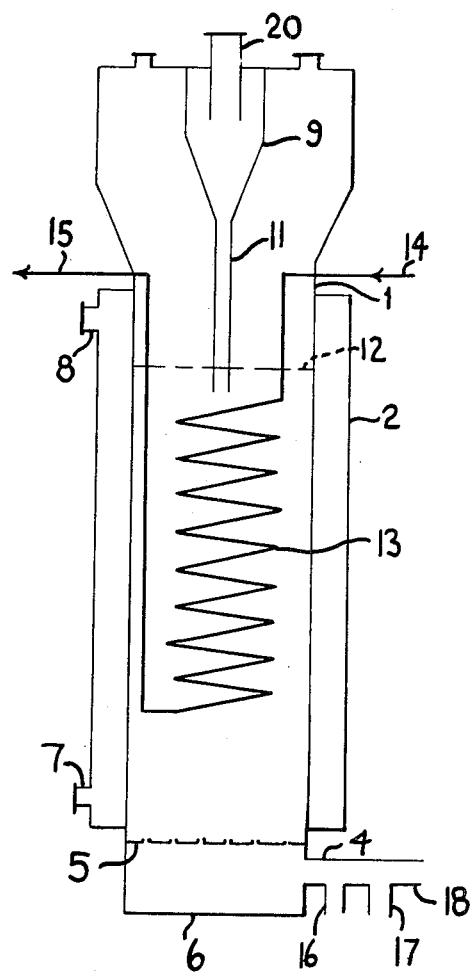

3,631,206
CONTROL OF OXYCHLORINATION REACTIONS
Lester E. Bohl and Raymond M. Vancamp, New Martinsville, W. Va., assignors to PPG Industries, Inc., Pittsburgh, Pa.
Continuation of application Ser. No. 219,334, Aug. 24, 1962. This application June 1, 1966, Ser. No. 554,475
Int. Cl. C07c *21/04*
U.S. Cl. 260—654 A — 7 Claims

ABSTRACT OF THE DISCLOSURE

The undesirable burning of organics in a fluidized bed of catalyst particles during an oxychlorination reaction is reduced and the rate of heat transfer is increased by employing two cooling surfaces in contact with the reaction zone. The first cooling surface is maintained at temperatures considerably below those necessary to maintain the oxychlorination taking place within the bed. The temperature of the second cooling surface is higher than that of the first surface and is at least in part at the threshold temperature necessary for the oxychlorination reaction being conducted.

---

This application is a continuation of our copending application U.S. Ser. No. 219,334 now abandoned, filed Aug. 24, 1962 which is a continuation-in-part of our U.S. Ser. No. 28,520, filed May 12, 1960, now abandoned.

The present invention relates to the production of chlorinated hydrocarbons. More particularly, the present invention relates to the production of chlorinated hydrocarbons by processes involving the catalytic oxychlorination of hydrocarbons and/or chlorohydrocarbons in fluidized beds.

Oxychlorination as utilized herein in the specification and claims refers to processes in which gaseous hydrogen chloride is utilized as a chlorinating agent. The processes contemplated involve the reaction of gaseous hydrogen chloride, an oxygen containing gas such as air or elemental oxygen and the hydrocarbon and/or chlorohydrocarbon to be chlorinated while in contact with a metal halide catalyst. It has been postulated that the HCl in these reactions is oxidized to free chlorine and water and the chlorine reacts with the organic feed to produce a chlorinated hydrocarbon. In another modification of oxychlorination procedures encompassed by the present invention, elemental chlorine is used as a feed gas in place of gaseous hydrogen chloride. This latter process theoretically operates in a manner similar to the first except that an initial chlorination of the hydrocarbon and/or chlorohydrocarbon takes place. Thus, free chlorine, an oxygen containing gas and the hydrocarbon or chlorohydrocarbon to be chlorinated are passed in contact with a metal halide catalyst. The chlorine reacts with the hydrocarbon or chlorohydrocarbon to produce hydrogen chloride and a chlorinated derivative of the hydrocarbon and/or chlorohydrocarbon. Hydrogen chloride produced in this manner is then converted by oxidation to chlorine and water and its chlorine content again utilized to achieve additional chlorinations of the hydrocarbon and/or chlorohydrocarbon feed material.

When a gas is passed through a bed of solid material, several different conditions may be established depending upon the gas velocity utilized, the size of the particles employed, and other similar considerations. Thus, if the gas velocity is low, the bed of solids remains static; the gas simply passes through the bed pores. On the other hand as the gas velocity is increased, at least some of the particles become dynamically suspended in the upwardly rising gas stream. As a result, the bed height expands. Such beds are termed in the art "dynamic beds." If the gas velocity is still further increased, the particles all become suspended and the bed expands even further. Ultimately, the bed may assume a highly turbulent condition which in many ways resembles a boiling liquid. These beds are termed in the art "fluid beds." The present process may be conducted with gas velocities that provide for dynamic and fluidized beds. The exact conditions requisite to establishing such bed conditions depends upon such factors as the particle size of the bed components, the gas velocity, density of the particles, etc. Wilhelm & Kwauk, Chemical Engineering Process, volume 44, page 201 (1948), equate the various factors necessary for fluidizing a bed of solid particles and by following the principles therein discussed, the desired bed condition may be provided. Preferably in the instant process, fluid beds are employed though it should be understood that in discussing fluid beds in the specification and claims applicants mean both highly turbulent beds and dynamic beds.

In conducting fluid bed reactions involving catalytic oxychlorination procedures, many difficulties are encountered. One of the most serious difficulties encountered in the operation of a fluidized bed in which a catalytic oxychlorination reaction is taking place is the removal of heat in sufficient quantities to permit operation of a given oxychlorination procedure with the ultimate achievement of satisfactory yields of product. Oxychlorination reactions in general are exothermic in nature and large quantities of heat are generated during these reactions. As a result of the generation of heat within the fluid beds utilized to conduct oxychlorination reactions, considerable quantities of the hydrocarbon and/or chlorohydrocarbon materials fed to the reaction zones are lost due to the presence of oxygen and the high heat encountered in such reactions. The presence of oxygen and sufficient temperature to permit oxidation of the organic feed materials results in considerable loss of hydrocarbon and/or chlorohydrocarbon materials fed to such reaction zones. Thus, it is encumbent upon one engaged in the operation of a fluid bed oxychlorination reaction to remove heat as quickly as possible after it is released in the fluid bed due to these deleterious reactions of the feed materials.

In accordance with the present invention, an effective method is provided for removing heat from oxychlorination reactions conducted in fluid beds. By recourse to the operations heerinafter set forth, oxychlorination reactions may be conducted in fluidized bed reactors with a considerable reduction in the burning or oxidation normally encountered and a consequent increase in the yield of desired products. Thus, it has been found in accordance with this invention that considerable heat may be removed from reaction zones in which oxychlorination reactions are taking place by presenting to the reactant gases present in the oxychlorination reaction zones at least two cooling surfaces having different temperature conditions prevailing therein. Thus, in conducting a fluid bed oxychlorination reaction, a relatively cold cooling surface is provided and operated at temperatures considerably below those necessary to maintain the oxychlorination reaction taking place within the bed. A second surface is provided which operates at a temperature considerably higher than the first and removes a small quantity of heat from the reaction zone. This second surface at least in part operates at the threshold temperature necessary for the oxychlorination reaction being conducted. The colder operating surface is controlled in its overall surface area so that the reaction taking place within the reaction zone is not quenched by the cooling action of this surface. Typically this cooler surface removes 90 percent or more of the heat released inside the fluid bed.

For a more complete understanding of the present invention, reference is made to the accompanying drawing which shows diagrammatically one embodiment of the present invention.

As seen in the figure, a reactor 1 is provided and is surrounded by a jacket 2; located in the center of the reactor is a cooling coil 13. The reactor is provided at the bottom portion with a gas introduction means or conduit 4 and the bottom of the reactor has a distributor plate 5 located therein for the distribution of gases fed to the wind box 6 through the reactor feed inlet 4. The jacket 2 is maintained under pressure with a nitrogen purge placed upon a reflux condenser (not shown) and connected to the upper portion of the jacket through a line 8. A suitable coolant medium such as boiling Dowtherm is circulated in the jacket, condensed in a reflux condenser and recirculated to the jacket through line 7. Located in the upper portion of the reactor is a cyclone separator 9 provided with suitable gas inlets (not shown), and a dip leg 11, extending down into the fluidized bed. The upper level of the fluidized bed is indicated by the numeral 12. A cooling coil 13 is located in the central portion of the reactor and is connected to an inlet 14 and an outlet 15 for circulation of coolant into and out of the cooling coil.

In the operation of a fluidized bed in accordance with this invention, reactor 1 is charged to a suitable level with the catalytic material usually a copper chloride-potassium chloride catalyst impregnated on a porous inert carrier as will be hereinafter more fully described.

The gaseous materials to be reacted, that is, a hydrocarbon and/or chlorohydrocarbon, an oxygen containing gas, and either HCl or elemental chlorine are introduced through line 4 via inlets 16, 17 and 18 into the wind box 6 and passed through the distributor plate 5 to the fluidized bed of particles contained in the reactor 1. The velocity of the gases passing through the distributor plate dynamically suspends the particles contained in the bed and the bed height expands approximately to the level indicated by numeral 12 of the drawing. The gases are fed to the reaction zone and upon contacting the catalyst reaction between the various components of the gas stream introduced takes place. The exothermic heat of the reaction generated in the fluidized bed by contact of the gases with the catalytic material is removed by virtue of the operation of the jacket 2 and the cooling coils 13 located in the bed. In order to properly control the reactions taking place within the bed, the cooling medium introduced through line 14 to the bed is preferably maintained at a temperature of 250 F.° or less. The coolant exiting from the cooling coil through line 15 is normally permitted to attain temperatures on the order of 240 F.° to 280 F.° The jacket surrounding the reactor is maintained at temperatures conveniently on the order of 500 F.° to 600 F.°

The temperature differential between the cooling surface at the center of the bed and at the side of the reactor is usually 100 F.° or more. The exact temperature obtained in the cooling media will be varied depending upon the oxychlorination reaction being conducted in the fluidized bed. The temperatures given above relate particularly to a fluidized bed reactor in which ethylene is being subjected to an oxychlorination reaction with HCl and air or oxygen for the production of 1,2-dichloroethane. In operations involving the production of other hydrocarbon chlorides, the temperature conditions in the cooling coil and reactor jacket will vary considerably. However, the temperature differential between the jacket and the cooling coil located in the fluidized bed itself will always be maintained at least 100 F.° preferably somewhere between 200 F.° to 500 F.°

The catalyst employed in conducting oxychlorination reactions in accordance with this invention are generally multivalent metal halides, particularly chlorides of metals such as copper, iron, chromium, etc. impregnated on a carrier. Generally, copper containing oxychlorination catalysts are preferred, and a particularly effective catalyst for conducting fluidized bed reactions in which oxychloriantion on procedures are encountered is a copper chloride-potassium chloride mixed catalytic material impregnated on a calcined fuller's earth.

The selection of the particular carrier on which the metal salt or oxide is to be impregnated is somewhat variable and materials such as alumina, silica, kieselguhr, fuller's earth, etc. may be employed. A particularly effective carrier for conducting oxychlorination reactions involving fluid bed operations is Florex, (a calcined fuller's earth manufactured by the Floridin Corporation). A Florex carrier impregnated with equal molar proportions of copper chloride and potassium chloride forms a preferred catalyst for conducting the fluid bed operations hereinafter described.

The fluid beds employed in accordance with the teachings of this invention typically contain catalyst particles ranging in size from 30–100 mesh. Typically, the catalyst particles are maintained in the size range such that 90 percent of the catalyst particles contained in the fluidized beds are between 240–600 microns in size.

The particular manner in which the metal halides are placed upon the carrier particles may be somewhat varied and generally speaking, the carrier particles are impregnated by immersion of the carrier in a solution containing the metal components. If desired, a metal halide containing solution may be placed on the carrier particles while rotating the particles in a mixing or tumbling device. Furthermore, a fluidized bed of carrier particles may be sprayed with a metal halide solution and enough heat supplied to the bed to evaporate the water of solution in order to accomplish desired deposition.

As previously stated, in conducting oxychlorination reactions various temperatures may be employed depending upon the ultimate hydrocarbon chloride product desired and the starting materials. These temperatures are well known to those skilled in the art. The precise temperature conditions employed will depend upon the hydrocarbon and/or chlorohydrocarbon fed to the bed and the desired hydrocarbon chloride product. Generally speaking, fluidized beds in oxychlorination reactions are conducted at temperatures ranging from 470–1100 F.°

Similarly, depending upon the desired hydrocarbon chlorides and hydrocarbon materials employed as well as the chlorinating agent utilized recourse to various feed conditions may be had without in any way disturbing the efficacy of the invention herein disclosed.

Thus, in conducting the fluidized bed oxychlorination procedures in accordance with the teachings of this invention aliphatic hydrocarbons containing from 1 to 4 carbon atoms and their incompletely chlorinated derivatives are fed in the gaseous phase along with oxygen and a chlorinating agent selected from the group consisting of HCl and $Cl_2$ and mixtures of HCl and $Cl_2$ to a catalytic oxychlorination reaction zone. The velocity of the gases entering the zone are such that the entire bed of catalyst particles contained in the catalytic reaction zone is fluidized and the particles attain the state of random motion. The reactions occurring in the fluidized bed are exothermic in nature and once the reaction has commenced, the circulating heat transfer medium located in the jacket surrounding the reaction zone and in the cooling coils immersed in the fluidized bed are so controlled that the desired reaction temperature for the reaction undergoing oxychlorination is readily achieved.

The heat transfer surfaces and the circulation of the cooling fluids are so designed that about 90 percent of the exothermic heat of reaction released in the bed is removed through the low temperature cooling surface contained in the bed itself. The temperature of the other cooling surface surrounding the reaction zone is maintained at least in part at or near reaction temperatures so that operation of the cold surface does not in any way seriously impair the oxychlorination reaction or quench it. The control of these heat transfer surfaces can be readily accomplished by recourse to automatic temperature control equipment in the form of temperature sensing devices located in thermowells inserted into the circulating cooling fluids and in the fluidized bed itself. Thus, by constantly recording temperatures and automatically adjusting the flow rate and temperature of the heat transfer media circulating in the cooling coils and in the jacket of the fluidized reactor, a constant temperature differential between the internal cooling system and the external cooling system is readily maintained and the temperature of the reaction zone controlled within precise limits.

While automatic equipment may be employed it is of course possible to employ manual techniques in controlling the temperatures of the cooling media circulating in the internal cooling system and the external cooling system. Thus, in response to temperature measurements taken in the cooling systems and in the reactor itself, manual operation of flow control valves on the internal cooling system and the external cooling system can readily adjust the temperature differential should this differential cease to be within the desired temperature range.

For a more complete understanding of the present invention reference is made to the following examples which are illustrative of certain methods which may be employed in conducting fluidized bed reactions in accordance with the instant invention.

EXAMPLE I

A nickel reactor 8 feet in height and 15 inches in diameter is employed as a fluid bed reactor. The reactor is enclosed in a 20 inch diameter steel jacket forming an annular heat exchange system. Dowtherm (a diphenyl-diphenyl oxide eutectic) contained in the jacket is used to heat or cool the fluid bed. An 8 inch nickel cyclone is located in the top of the reactor in a 20 inch diameter by 18 inch high expanded section. Located in the bottom of the reactor is a nickel distributor plate having a plurality of drilled holes in it. Below the distributor plate is a chamber or box closed at the sides and bottom and serving as an introduction chamber for the reactant feed gases. Gas is introduced into the reactor by passing it through the chamber and the drilled holes of the distributor plate to the reactor proper.

The reactor is filled to a depth of 6 feet with catalyst particles which are prepared by dissolving 440 grams of copper chloride and 186 grams of potassium chloride in 1,000 cubic centimeters of water to form a stock solution. Five hundred and eighty-six grams of stock solution prepared in this manner are diluted to 1533 cubic centimeters volume with distilled water and this diluted solution is utilized to supply catalyst to the carrier. This solution is added to Florex (a calcined fuller's earth) carrier particles 30 to 60 mesh (U.S. sieve series) in size which are placed in a rototumbler. The solution is added to the rototumbler in dropwise fashion and the rototumbler is continuously heated during the addition. When the solution is completely added the impregnated Florex is dried in the rototumbler by rotating it for an additional 30 minutes and heating the contents of 284 F.° Based on the total weight of the carrier, the finished catalyst contains 10 percent by weight copper.

The three gas feed lines provided for the introduction of oxygen, hydrocarbons and/or hydrocarbon chlorides, and a chlorinating agent are located in the bottom of the reactor. A cooling coil consisting of 36 feet of ½ inch nickel pipe is located in the upper portion of the fluid bed and water under a pressure of 30 lbs. per square inch gauge is circulated through the coil to remove heat generated in the reaction zone. The temperature of the water passed into the coil is varied between 200 F.° to 220 F.° The reactor jacket is maintained at a temperature between 350 F.° to 400 F.°

Using this apparatus in this fashion ethylene, HCl and oxygen are fed to the chamber of the reactor in a molar feed ratio of ethylene to HCl to oxygen of 1.0 to 2.0 to 0.58. The superficial linear velocity of the gases fed to the reaction zone is 0.4 foot per second. The bed temperature of the reactor is maintained at about 550 F.° Operating the reactor in this manner ethylene is converted to ethylene dichloride in yields of 95 percent or better.

EXAMPLE II

Utilizing the reactor of Example I and regulating the cooling coil in the center of the bed at temperatures between 220 F.° to 240 F.° and regulating the jacket temperature between 600 F.° to 650 F.°, ethylene dichloride, HCl and oxygen are fed to the chamber of the reactor in a molar ratio of 1.0 to 1.1 to 1.2. The superficial linear velocity of the gases entering the reaction zone is 0.5 foot per second. The bed temperature in the zone is maintained between 750 F.° to 850 F.° Perchlorethylene and trichloroethylene are produced in this manner and utilizations of ethylene dichloride to chlorinated organics is 85 percent while halide utilizations of 90 percent are obtained.

EXAMPLE III

Utilizing the equipment of Example I, 1,2-dichloroethane, chlorine and oxygen are fed to the reactor and reacted therein. The jacket temperature is maintained at temperatures between 600 F.° and 650 F.° The cooling coil temperature is regulated between 220 F.° to 240 F.° The molar feed ratio of 1,2-dichloroethane to chlorine to oxygen is maintained at 1 to 0.6 to 1.05. The superficial linear velocity of the gases entering the fluidized bed is regulated at 0.3 foot per second. The bed temperature in the fluidized bed is maintained between 750 F.° to 850 F.° Operating under these conditions perchloroethylene and trichloroethylene are produced in good yields with the utilization of ethylene dichloride obtained of about 75 percent.

As can be seen readily from the above examples, adequate operation of a fluidized bed in which hydrocarbons and/or chlorohydrocarbons are oxychlorinated to provide hydrocarbon chloride product streams while attaining sufficient cooling of the exothermic reaction conditions prevailing in the catalytic fluidized beds is readily accomplished. No quenching of the reactions takes place and the utilization of both the chlorinating agent and hydrocarbon and/or chlorohydrocarbon are within the desirable limits.

While the invention has been described with reference to certain specific embodiments, it is of course understood that the process may be varied considerably within the skill of the art. Thus, with respect to the chlorinating agent employed while specifically the utilization of chlorine and HCl have been shown in the examples, it is of course understood that mixtures of HCl and chlorine may be employed. When mixtures are employed proper considerations of the stoichiometry of the reaction taking place within the reaction zone to achieve the desired product are adhered to and are well within the skill of the art.

Maintenance of a specific temperature differential between the two cooling surfaces employed in conducting the reaction provides several advantages in the operation of fluidized beds. Thus, the colder surface, located in the center of the fluidized bed where the gases are passed in rapid contact therewith, operates to remove the high heats of reaction released in very short periods of time thereby considerably reducing the hazards of high localized temperatures causing excess burning of hydrocarbon present in the bed at these points. The utilization of a secondary cooling surface which operates at or near the threshold temperature of the reaction provides a means for heating particles which may be excessively cooled during passage through the center of the bed and at or near the cooling surface located therein to provide catalyst particles at the proper temperature for reaction with the various reactant gases fed thereto. In this manner the advantage of rapid cooling for the prevention of burning and the maintenance of optimum temperatures for reactions taking place within the fluidized bed is readily accomplished.

With respect to other hydrocarbons and chlorohydrocarbons not specifically shown in the illustrated embodiments, it is of course to be understood that the cooling jacket or high temperature cooling surface will be maintained at temperatures typically 100 F.° to 150 F.° lower than the optimum reaction temperature for the specific hydrocarbon being oxychlorinated. The low temperature cooling surface is at least 150 F.° lower than the optimum reaction temperature, typically 200 F.° to 400 F.° lower. These reaction temperatures are disclosed in the prior art and the operation of the cooling surface at specific temperatures which are lower than these temperatures is thus readily ascertainable.

While the invention has been described with reference to specific embodiments, it is of course to be understood that it is not to be limited thereby except insofar as appears in the accompanying claims.

What is claimed is:

1. In an oxychlorination process wherein:
  (a) a member selected from the group consisting of an aliphatic hydrocarbon containing from 1 to 4 carbon atoms, and an incompletely chlorinated derivative of an aliphatic hydrocarbon containing from 1 to 4 carbon atoms,
  (b) oxygen, and
  (c) a chlorination agent selected from the group consisting of HCl, $Cl_2$ and mixtures of HCl and $Cl_2$
are reacted in a fluidized bed of oxychlorination catalyst particles at an oxychlorination reaction temperature to produce a hydrocarbon chloride and to liberate heat, the improvement comprising: providing at least two cooling surfaces in contact with said fluidized bed, the first of said cooling surfaces being maintained at a temperature below that necessary to maintain the oxychlorination reaction taking place within the bed and at least 100 F.° below the temperature of the second of said cooling surfaces, the temperature of said second surface being low enough to remove heat from said fluidized bed but high enough to avoid a quenching of the reaction in said fluidized bed by said first surface, the temperatures of said surfaces being regulated by heat transfer from said surfaces to fluid heat transfer media which remain isolated from said fluidized bed.

2. The oxychlorination process of claim 1 wherein the first of said cooling surfaces is disposed within said fluidized bed and wherein the second of said cooling surfaces forms an exterior boundary of said fluidized bed.

3. The oxychlorination process of claim 1 wherein said first surface removes 90 percent or more of the heat released inside said fluidized bed.

4. The oxychlorination process of claim 6 wherein said first surface removes 90 percent or more of the heat released inside said fluidized bed.

5. The oxychlorination process of claim 7 wherein said first surface removes 90 percent or more of the heat released inside said fluidized bed.

6. In an oxychlorination process wherein ethylene, oxygen and a chlorination agent selected from the group consisting of HCl, $Cl_2$ and mixtures of HCl and $Cl_2$ are reacted in a fluidized bed of oxychlorination catalyst particles at an oxychlorination reaction temperature to produce ethylene dichloride and to liberate heat, the improvement comprising: providing at least two cooling surfaces in contact with said fluidized bed, the first of said cooling surfaces being maintained at a temperature below that necessary to maintain the oxychlorination reaction taking place within the bed and at least 100 F.° below the temperature of the second of said cooling surfaces, the temperature of said second surface being low enough to remove heat from said fluidized bed but high enough to avoid a quenching of the reaction in said fluidized bed by said first surface, the temperatures of said surfaces being regulated by heat transfer from said surfaces to fluid heat transfer media which remain isolated from said fluidized bed.

7. In an oxychlorination process wherein ethylene dichloride, oxygen and a chlorination agent selected from the group consisting of HCl, $Cl_2$ and mixtures of HCl and $Cl_2$ are reacted in a fluidized bed of oxychlorination catalyst particles at an oxychlorination reaction temperature to produce perchloroethylene and trichloroethylene and to liberate heat, the improvement comprising: providing at least two cooling surfaces in contact with said fluidized bed, the first of said cooling surfaces being maintained at a temperature below that necessary to maintain the oxychlorination reaction taking place within the bed and at least 100 F.° below the temperature of the second of said cooling surfaces, the temperature of said second surface being low enough to remove heat from said fluidized bed but high enough to avoid a quenching of the reaction in said fluidized bed by said first surface, the temperatures of said surfaces being regulated by heat transfer from said surfaces to fluid heat transfer media which remain isolated from said fluidized bed.

References Cited

UNITED STATES PATENTS

| | | | |
|---|---|---|---|
| 3,232,889 | 2/1966 | Bellis | 260—659 OXY |
| 2,957,924 | 10/1960 | Heiskell et al. | 260—659 OXY |
| 2,898,384 | 8/1959 | Viriot | 260—662 |
| 2,783,286 | 2/1957 | Reynolds | 260—659 OXY |
| 2,644,846 | 7/1953 | Johnson et al. | 260—659 OXY |
| 2,779,777 | 1/1957 | Mungen | 260—449.6 |

LEON ZITVER, Primary Examiner

J. A. BOSKA, Assistant Examiner

U.S. Cl. X.R.

260—658 R, 659 A, 662 A